United States Patent
Lawwill et al.

[19]

[11] Patent Number: 6,102,421
[45] Date of Patent: *Aug. 15, 2000

[54] REAR SUSPENSION FOR A BICYCLE

[75] Inventors: Merton R. Lawwill, Tiburon, Calif.; Mark L. Schroeder, Boulder, Colo.

[73] Assignee: Schwinn Cycling & Fitness Inc., Boulder, Colo.

[*] Notice: This patent issued on a continued prosecution application filed under 37 CFR 1.53(d), and is subject to the twenty year patent term provisions of 35 U.S.C. 154(a)(2).

[21] Appl. No.: 08/919,564

[22] Filed: Aug. 29, 1997

Related U.S. Application Data

[63] Continuation-in-part of application No. 08/616,591, Mar. 15, 1996, Pat. No. 5,957,473.

[51] Int. Cl.$^7$ .................................................. B62K 1/00
[52] U.S. Cl. ..................... 280/284; 280/275; 280/285
[58] Field of Search ................................. 280/284, 283, 280/285, 275, 281.1; 180/227

[56] References Cited

U.S. PATENT DOCUMENTS

| | | |
|---|---|---|
| D. 368,678 | 4/1996 | Wilcox et al. . |
| 452,073 | 5/1891 | Huelsen et al. . |
| 644,788 | 3/1900 | Williams . |
| 707,262 | 8/1902 | Sager et al. . |
| 709,718 | 9/1902 | Monahan . |
| 3,917,313 | 11/1975 | Smith et al. . |
| 3,982,770 | 9/1976 | Satoh et al. . |
| 4,058,181 | 11/1977 | Buell . |
| 4,114,918 | 9/1978 | Lutz . |
| 4,789,174 | 12/1988 | Lawwill . |
| 5,098,114 | 3/1992 | Jones . |
| 5,121,937 | 6/1992 | Lawwill . |
| 5,205,572 | 4/1993 | Buell et al. . |
| 5,217,241 | 6/1993 | Girvin . |
| 5,225,674 | 7/1993 | Buell et al. . |
| 5,244,224 | 9/1993 | Busby . |
| 5,259,637 | 11/1993 | Busby . |
| 5,301,974 | 4/1994 | Knapp . |
| 5,306,036 | 4/1994 | Busby . |
| 5,316,327 | 5/1994 | Bell . |
| 5,332,246 | 7/1994 | Buell . |
| 5,335,929 | 8/1994 | Takagaki et al. . |
| 5,354,085 | 10/1994 | Gally . |
| 5,409,249 | 4/1995 | Busby . |
| 5,413,368 | 5/1995 | Pong et al. . |
| 5,452,910 | 9/1995 | Harris . |
| 5,509,679 | 4/1996 | Leitner . |
| 5,553,881 | 9/1996 | Klassen et al. . |
| 5,628,524 | 5/1997 | Klassen et al. . |
| 5,957,473 | 9/1999 | Lawwill ................................. 280/284 |

FOREIGN PATENT DOCUMENTS

| | | |
|---|---|---|
| 753260 | 10/1933 | France . |
| 884138 | 8/1943 | France . |
| 996586 | 12/1951 | France . |

*Primary Examiner*—Daniel G. DePumpo
*Attorney, Agent, or Firm*—Holland & Hart LLP

[57] ABSTRACT

A rear suspension bicycle having a rear wheel with an axle, a frame including a seat tube and a down tube having a top and bottom ends, a pair of drop link members, one for either side of the rear wheel, each having a top attachment point and a bottom attachment point, and an axle attachment point for receiving the axle. A seat stay assembly including a front end and a rear end, and having a front pivot point adjacent the front end for pivotal attachment to the down tube defining a first pivot point, and a pair of rear pivot points, each for pivotal attachment to the top attachment point of one of said drop link members, forming together the second pivot point. A chain stay assembly having a front end and a rear end, and defining a front pivot point at the front end, and a pair of rear pivot points at the rear end, the front pivot point for pivotal attachment adjacent to the bottom end of the seat tube forming the third pivot point, and a pair of rear pivot points, each for pivotal attachment to the bottom attachment point of one of the drop link members, forming together the fourth pivot point. A shock-absorbing element is mounted between the seat stay assembly and the frame. When the rear wheel is moved upwardly with respect to the frame, the axle traces a complex curvilinear axle path generally upwardly, moving first rearwardly to a rearwardmost position, then forwardly along the upward axle path. The rear suspension transmits the pedal force generated by the rider efficiently into forward moving force without compressing the suspension appreciably.

14 Claims, 9 Drawing Sheets

REAR SUSPENSION FOR A BICYCLE

RELATED APPLICATION

The present application is a continuation-in-part of application Ser. No. 08/616,591 filed Mar. 15, 1996, now U.S. Pat. No. 5,957,473 for REAR SUSPENSION BICYCLE, which is hereby incorporated by reference.

FIELD OF THE INVENTION

This invention relates to bicycles, and more particularly relates to a new and improved rear suspension for a bicycle.

BACKGROUND OF THE INVENTION

Bicycle suspensions have become popular because they allow riders to ride more comfortably over rough terrain, and with more control in difficult circumstances. Rear suspension systems are particularly important in improving comfort and safety, and have been developed to the point of allowing more than 6" of vertical suspension travel of the rear wheel. The onset of downhill mountain bike racing in the early 1990's prompted the design of rear suspensions having large amounts of suspension travel.

When the rear suspensions designed for downhill mountain bike racing are transferred to more general types of mountain bikes, the forward motive force generated by the rider through the drive train is partially used to activate the suspension system. The partial activation of the rear suspension reduces the efficiency with which the rider's pedaling energy is transmitted to the forward movement of the bicycle. While this phenomenon occurs in downhill style mountain bikes, it is not an important issue because of the particular downhill riding style. When the energy loss phenomenon occurs in a more general type of mountain bike, the resulting inefficiencies can drastically affect performance.

In addition, the rear suspension designs presently available often have a changing energy absorption rate through the suspension travel which inhibits the rider's use of the top portions of the suspension travel. In other words, as the rear suspension moves through the designed travel range, the suspension becomes more and more stiff and it becomes more difficult to utilize the end of the suspension travel than to utilize the early portions of the suspension travel. As the suspension travel is compressed the harder it becomes to compress further.

There has been an increased interest to have active rear suspensions which provide a great deal of vertical travel, but that are more efficient in transferring the pedaling force of the rider to the forward movement of the bicycle without losing energy to compression of the rear suspension. Bikes having these types of rear suspensions are considered all-around, cross country or free-ride type mountain bikes.

There is a continuing need in the art for an improved rear suspension which is more efficient in transferring the pedaling force of the rider to the forward movement of the bike, and to minimize the energy lost in compressing the rear suspension.

SUMMARY OF THE INVENTION

The present invention in general terms concerns a rear suspension system of a bicycle that efficiently transmits the pedal force to forward movement of the bicycle. The rear suspension system of the present invention overcomes many of the aforementioned problems. The rear suspension is energy-efficient, well balanced, and provides exceptional suspension travel, among other important advantages that are discussed below.

The invention generally includes a rear suspension bicycle having a rear wheel with an axle, a frame including a seat tube and a down tube having a top and bottom ends, a pair of drop link members, one for either side of the rear wheel, each having a top attachment point and a bottom attachment point, and an axle attachment point for receiving the axle. A seat stay assembly is also included, having a front end and a rear end, and having a front pivot point adjacent the front end for pivotal attachment to the seat tube defining a first pivot point, and a pair of rear pivot points, each for pivotal attachment to the top attachment point of one of said drop link members, forming together the second pivot point. A chain stay assembly is included, having a front end and a rear end, and defining a front pivot point at said front end, and a pair of rear pivot points at the rear end. The front pivot point for pivotal attachment adjacent to the bottom end of the seat tube forms the third pivot point, and the pair of rear pivot points, each for pivotal attachment to the bottom attachment point of one of the drop link members, forms together the fourth pivot point. A shock-absorbing element is mounted between the seat stay assembly and the frame. When the rear wheel is moved upwardly with respect to the frame, the axle traces a curvilinear axle path generally upwardly, moving first rearwardly to a rearwardmost position, then forwardly along the upward axle path.

In addition, the axle path has a datum position prior to upward movement, and a terminal position at the top of upward movement, and a rearwardmost position in between the datum and terminal position, wherein the terminal position is forward of the datum position.

Accordingly, it is the primary object of the present invention to provide a rear suspension system for a bicycle that balances the forces developed while pedaling to efficiently transmit the force to the forward movement of the bicycle.

It is another object of the present invention to provide a rear suspension system for a bicycle that provides a desired axle path to effectively absorb impact to the rear wheel.

Other aspects, features and details of the present invention can be more completely understood by reference to the following detailed description of a preferred embodiment, in conjunction with the drawings, and from the appended claims.

DETAILED DESCRIPTION OF THE PREFERRED EMBODIMENT

Figure 1:
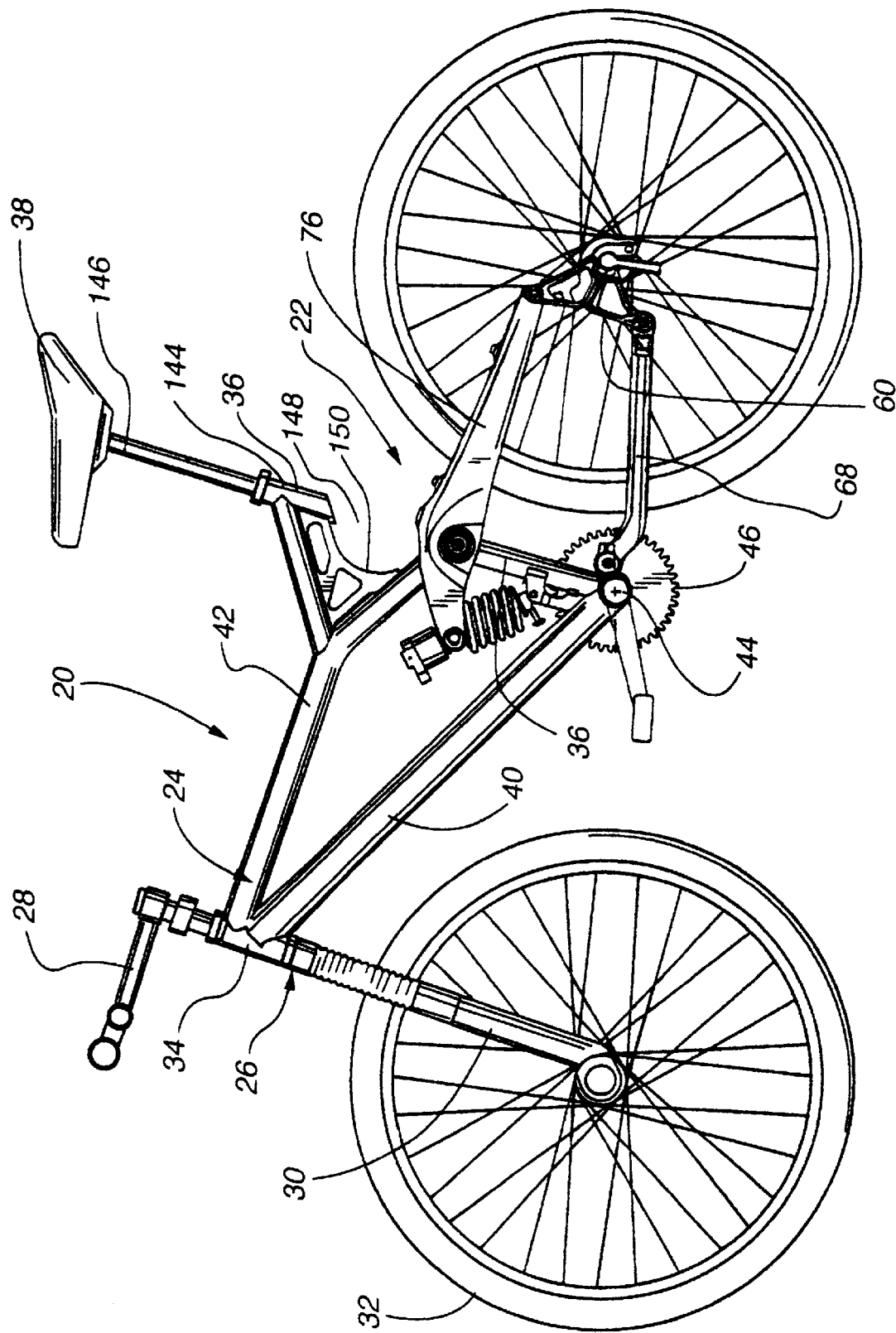
FIG. 1 is an elevation view a mountain bike incorporating the rear suspension of the present invention.

Referring to FIG. 1, a mountain bike 20 is shown which incorporates the rear suspension 22 of the present invention. The rear suspension of the present invention can also be used on other types of bicycles, as well as motorcycles, but the preferred embodiment is described herein as used on a mountain bike. The mountain bike includes a frame which rotatably supports a steering assembly 26. The steering assembly includes a handle bar 28 and fork 30. The fork 30 receives a front wheel 32 in a known manner, and also the handle bar, which allows the rider to steer the bicycle. The fork and handle bar are rotatably received in a head tube 34 at the front end of the frame 24. The bicycle frame also includes a seat tube 36 for adjustably supporting a seat 38, and a down tube 40 extending from the head tube 34 to the bottom of the seat tube 36. A top tube 42 extends from the head tube 34 to substantially the top of the seat tube. A bottom bracket 44 is attached to the frame 24 at the intersection of the seat tube 36 and the down tube 40, and rotatably supports the drive train 46. The drive train includes the chain ring(s), crank arms and pedals, all in a known manner.

Figure 2:
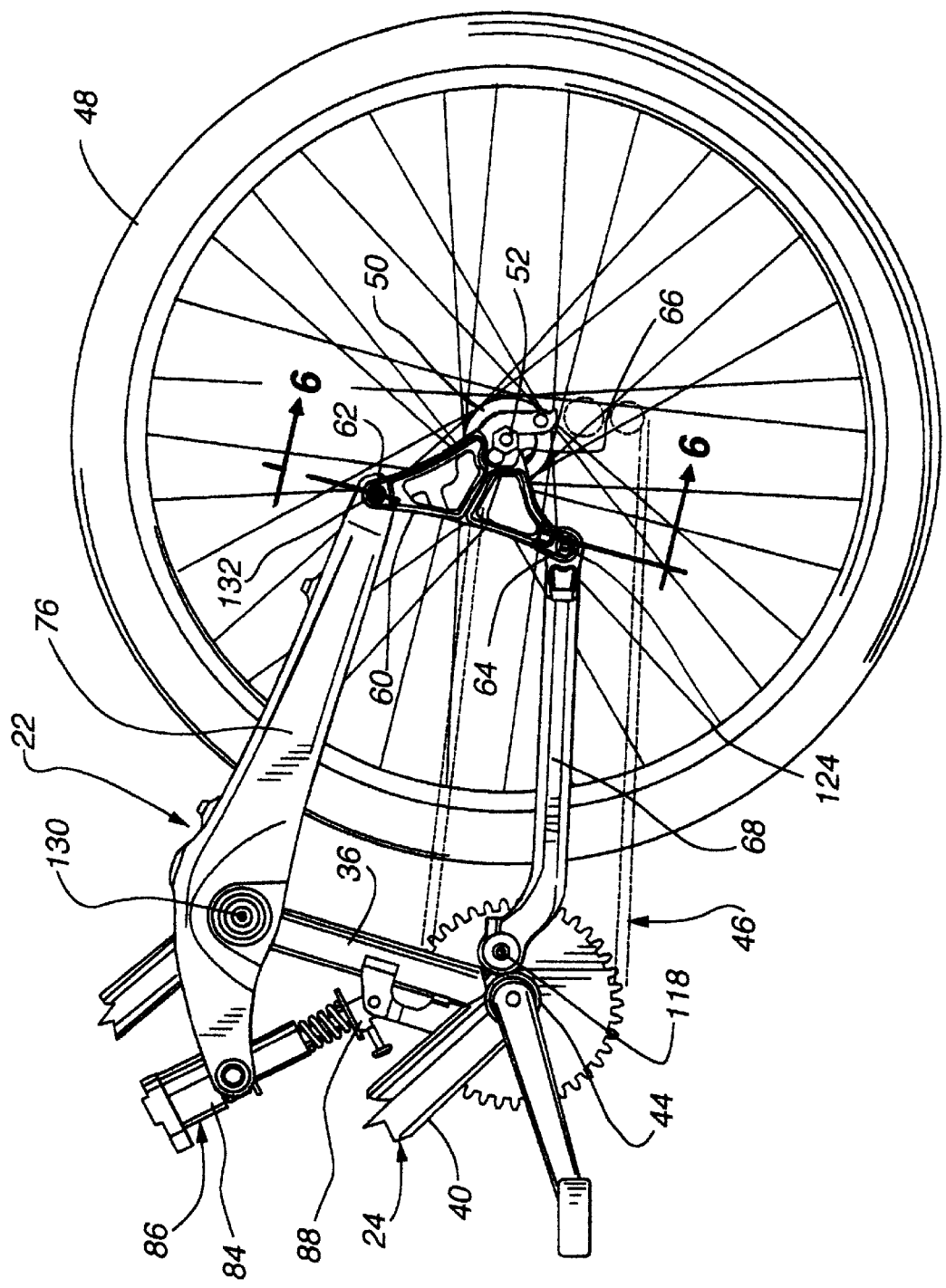
FIG. 2 is an enlarged partial elevation view of the rear suspension of the present invention.

The rear suspension system 22 of the present invention as shown in FIG. 2, is attached to the frame 24 and generally extends rearwardly from the seat tube. The rear suspension system rotatably supports a rear wheel 48. The rear wheel includes a hub 50 having an axle 52 and a gear set (not shown) extending from one side concentric to the axle. The rear suspension system 22 rotatably receives the axle 52 of the rear wheel 48 in a conventional manner. The drive train 46 is completed with the connection of the chain ring to the gear set by a chain, and includes a derailleur system which is controlled by the user to change gears on the front chain ring as well as on the rear gear set.

Figure 3:
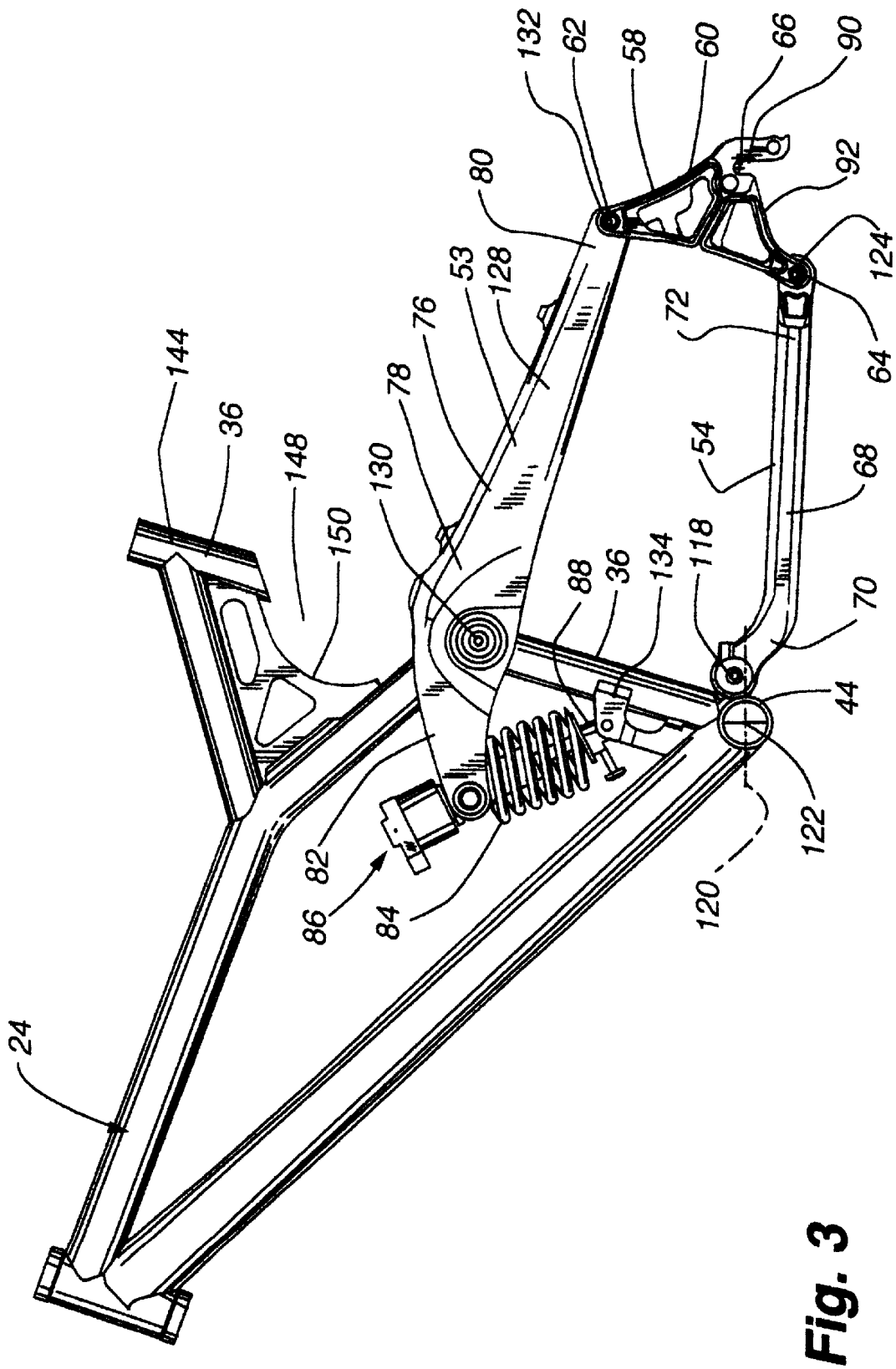
FIG. 3 is an elevation view of the frame of the bike, including the rear suspension of the present invention.
Figure 4:
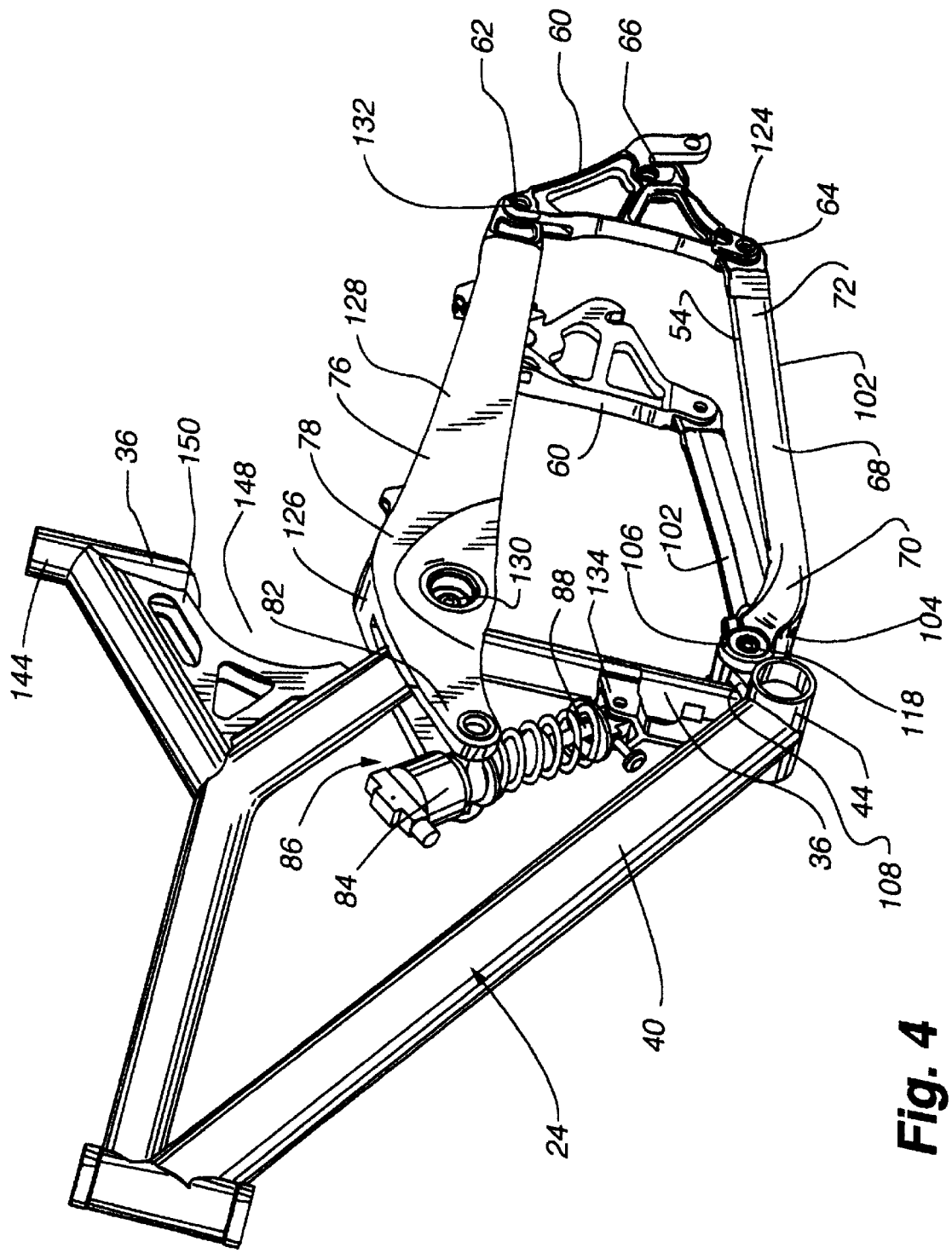
FIG. 4 is a front perspective view of the frame of the bike incorporating the rear suspension of the present invention.
Figure 5:
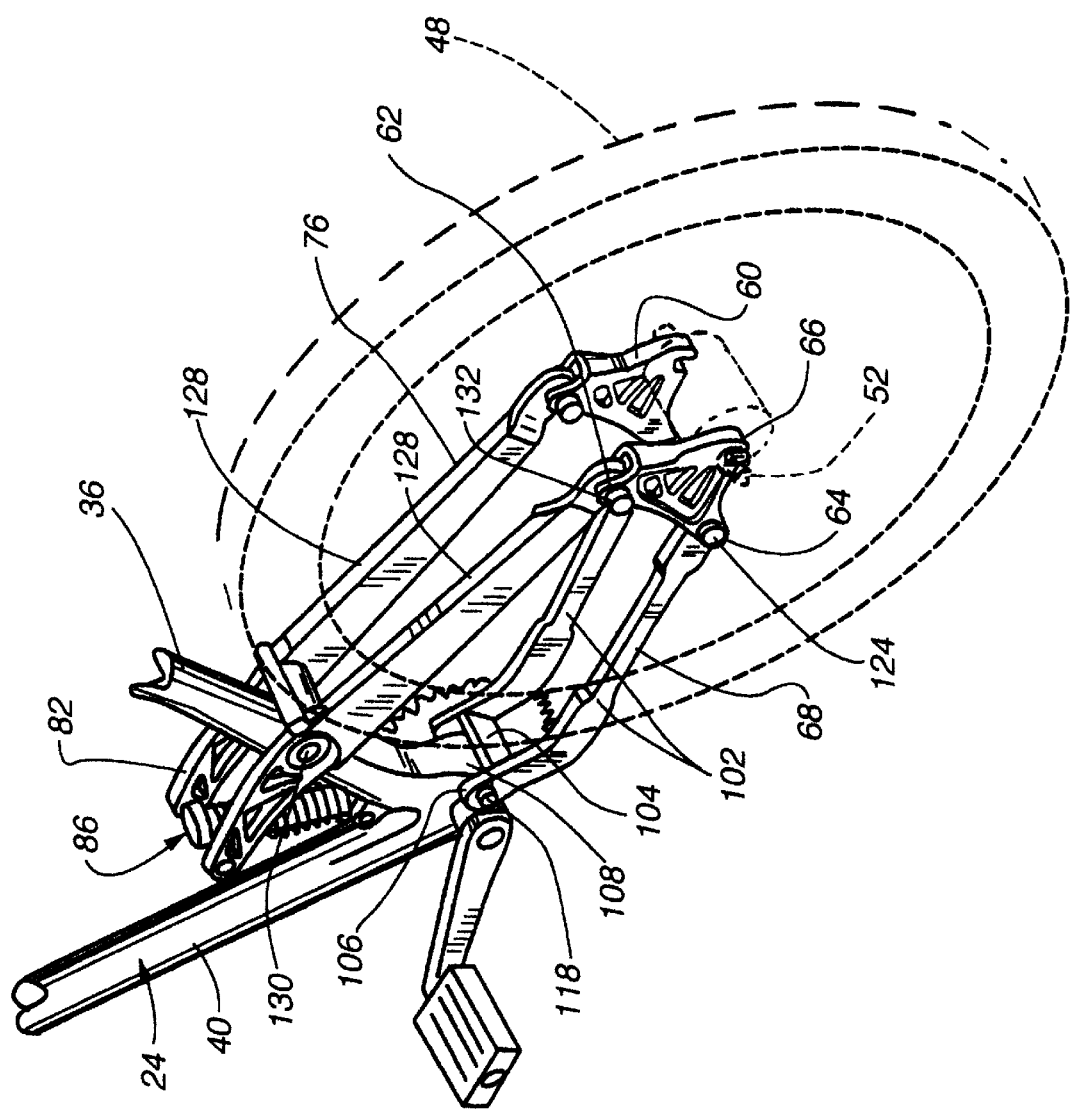
FIG. 5 is a rear partial perspective view of the rear suspension of the present invention.

As shown in FIGS. 3, 4 and 5, the rear suspension system 22 is made up of four links 53, 54, 56, and 58 pivotally attached together in a certain configuration, as defined below, to allow the rear wheel 48 of the mountain bike to move in a substantially vertical direction to absorb the shock and/or energy from impacting object such as rocks, stumps or the like. The rear suspension system includes a drop link assembly 60 having one drop link for each side of the rear wheel 48 and hub 50, and includes a top 62 and bottom 64 attachment points, as well as an axle attachment point 66. A chain stay assembly 68 pivotally attaches at a front end 70 to the bottom .bracket 44, and at the rear end 72 to the bottom attachment point 64 on the drop links 60. A seat stay 76 assembly pivotally attaches to the seat tube 36 adjacent its front end 78, between a point midway up the seat tube 36 from the bottom bracket 44, and at its rear end 80 to the top attachment point 62 of the drop links 60. A shock arm 82 extends forwardly from the seat stay assembly 76 to receive one end 84 of a shock-absorbing assembly 86. The other end 88 of the shock-absorbing assembly is mounted to the frame 24.

The rear suspension assembly 22 is designed such that when the rider actuates the drive train 46 by pedaling, which creates a force through the chain on the rear suspension system 22, the rear suspension does not appreciably compress or in other ways actuate, and thus efficiently transfers the rider's energy into forward movement of the bicycle. The pivotal link system of the rear suspension system 22 inhibits the actuation of the suspension travel due to the forces in the drive train 46 from pedaling, and thus efficiently transfers the pedaling force efficiently to the forward motion of the bicycle. However, when the rear wheel 48 impacts an object, the four link pivot system of the rear suspension system 22 allows the rear wheel to move in a substantially upward direction. The force of the impact is absorbed by actuating the shock-absorbing member 86 through the movement of the shock arm 82. The rear suspension system 22 returns the rear wheel 48 to the pre-impact position. The geometry of the various pivot points in the four links of the rear suspension system 22 creates a desired axle path and a preferably substantially level wheel rate.

The rear suspension system 22 of the present invention includes a pair of drop links 60, as shown in FIGS. 1 through 7. One drop link is positioned on either side of the rear wheel 48, and they are substantially mirror images of one another. Each drop link 60 has a substantially a triangular shape, with the top attachment point 62, bottom attachment point 64, and axle attachment point 66 forming the three points of the triangle. Preferably, the top attachment point is 4.125 inches from the axle attachment point, and the bottom attachment point is 3.625 inches from the axle attachment point. The line between the axle attachment point and the top attachment point, and the line between the axle attachment point and the bottom attachment point form an angle of approximately 95°. The triangular shape of each drop link 60 makes them very strong and rigid, which allows them to efficiently transfer any movement or force to the other members of the rear suspension system 22 to which each drop link 60 is attached. Each drop link can be a solid piece of plate metal, or can have apertures formed therethrough for weight saving. Suitable materials for making the drop links are forged or extruded aluminum, magnesium, or carbon composite. Ideally, the drop link 60 is at least rigid along the sides of the triangle which it forms in order to maximize the strength of the drop link given the material from which it is made.

As described in more detail below, each drop link 60 is oriented in the non-compressed stage (FIG. 2), such that the top attachment point 62 is upwardly and forwardly from the axle attachment point 66, and the bottom attachment point 64 is forwardly and downwardly positioned from the axle attachment point 66, and the bottom attachment 64 point is forwardly and downwardly positioned from the top attachment point 62. The axle attachment point 66 defines a downwardly opening recess 90 for receiving an end of the axle 52 in a conventional manner. The side 92 of the drop link between the axle attachment point 66 and the bottom attachment point 64 forms an inwardly directed curve to allow the derailleur to freely move as required to change gears and rotate to take up chain slack.

Figure 6:
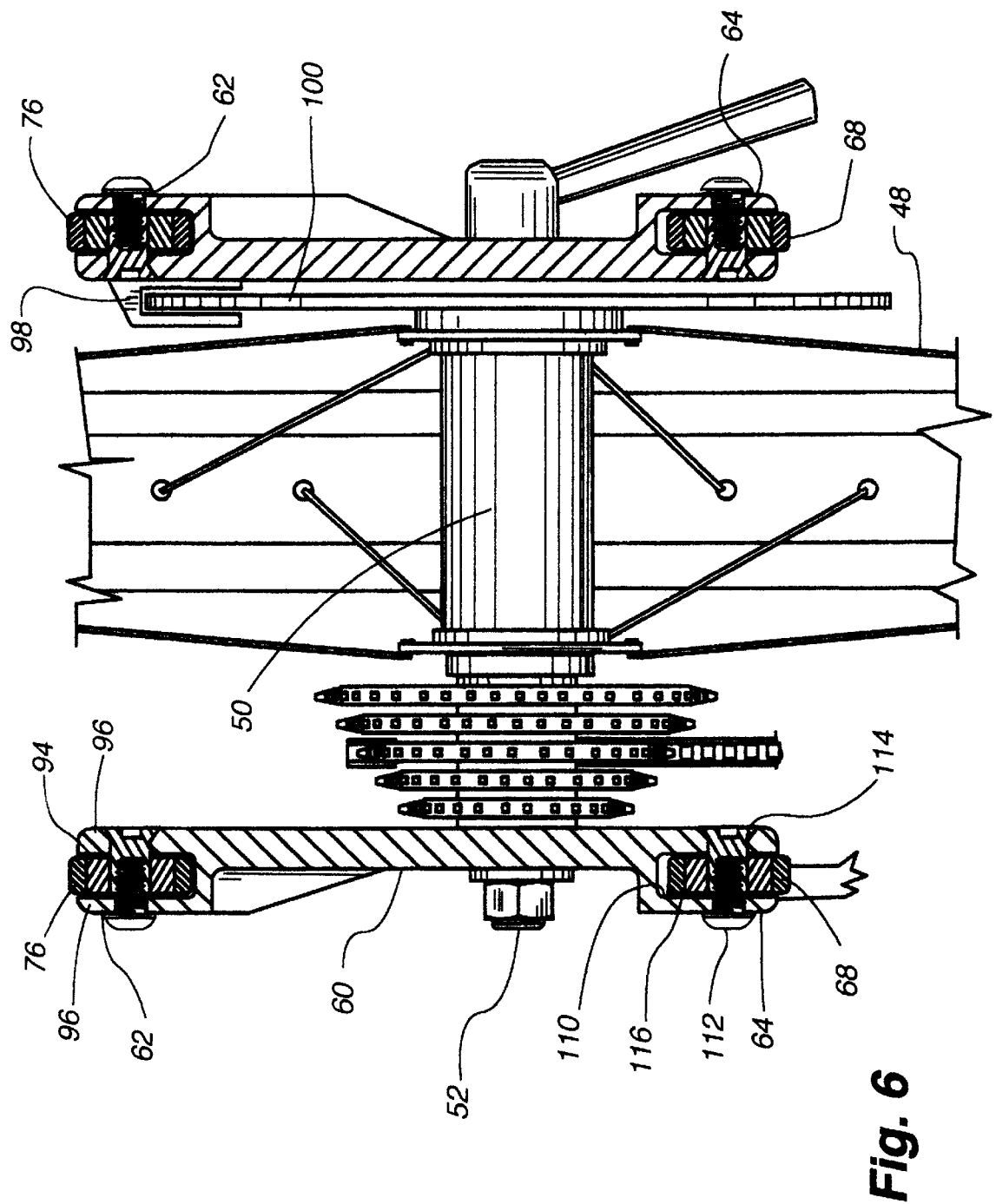
FIG. 6 is a section view taken along line 6—6 of FIG. 2.

The top attachment point 62 of the drop link 60 includes a slot 94 defined by co-extending flanges 96 for receiving the seat stay assembly 76, as is described further below (FIG. 6). An aperture is formed through both flanges 96 to allow a pivotal connection to be made pivotally with the seat stay assembly 76. The bottom attachment point 64 is similar to the top attachment point 62 for receiving the rear end 72 of the chain stay assembly 68.

Disc brake calipers 98 are attached to one of the drop links 60 to engage the disc 100 mounted to one side of the hub 50 of the rear wheel. The disc brake calipers 98 are actuated in a normal fashion by a brake lever on the handlebars. The axle 52 of the rear wheel 48 is attached to the drop links 60 in the axle attachment point 66 in a normal manner, such as by a quick release fastener.

The chain stay assembly 68, as shown in FIGS. 1, 2, 3, 4 and 5, is a substantially U-shaped member defining opposing legs 102 extending rearwardly from the base 104 of the U shape, one for extending along each side of the rear wheel 48. The chain stay 68 has a front end 70 and a rear end 72, the front end defining two spaced apart opposing flanges 106 extending forwardly from the base 104 of the U for pivotal attachment to the bottom bracket 44. The bottom bracket 44 defines a rearwardly extending shank 108 to which the forwardly extending flanges 106 of the chain stay 68 are pivotally attached by any known means, such as a press fit bearing or the like. The rear end of each of the legs of the chain stay assembly is positioned in the slot 110 formed by the bottom attachment point of a drop link, and is pivotally attached thereto in any known manner. One such manner is by a screw 112 received in a pin 114, with the pin engaging a bearing 116 inserted in the aperture formed through the end of the leg (see FIG. 6).

Preferably, the shank 108 extending from the rear of the bottom bracket 44 attaches to the front end of the chain stay 68 to create the third pivot point 118 which is positioned above a horizontal line 120 drawn through the rotational center of the bottom bracket 44 (FIG. 3). The rotational center 122 of the bottom bracket 44 is a convenient reference point, and is the center of rotation of the crank arms as supported in the bottom bracket 44. Preferably the third pivot point 118 is approximately 0.625 inches above the horizontal line 120, and approximately 1.5 inches along the horizontal line 120 behind the rotational center 122. This position helps obtain the desired axle path.

The position of the third pivot 118 can range from directly above the bottom bracket 44 by two inches to directly below the bottom bracket by two inches, or any position between along a rearward arc. Its position is limited to the rear by the rear tire 48, and forwardly by the bottom bracket 44. The chain stay assembly 68 extends downwardly and rearwardly a short distance from the third pivot point 118, and then extends substantially horizontally rearwardly to the bottom attachment 64 point of the drop link 60. Thus, in the non-compressed position, the bottom attachment 64 point of the drop link 60 is slightly below the bottom bracket 44, and is slightly below the pivotal attachment (third pivot point 118) of the chain stay 68 to the bottom bracket 44, as best seen in FIG. 3. The chain stay 68 is preferably made of aluminum or carbon composite. The legs 102 of the chain stay 68 preferably have an oval cross section for improving the rigidity of the legs along their length.

The fourth pivot 124 is the pivotal connection between the end of the chain stay 68 and the bottom attachment point 64 of the drop link 60. It is preferably 3.625 inches from the axle 52 at an angle of 30 degrees below the horizontal. The proper position of the fourth pivot 124 is dependent upon the position of the third pivot 118. The fourth pivot 124 could be horizontally even with, or up to 3 inches below the third pivot 118. The fore/aft position of the fourth pivot depends on the clearance with the rear derailleur, and preferably no more than approximately 4 inches in front of the rear axle 52 (when received in the axle attachment point). Other placement considerations include the particular spacing requirements preferred by the derailleur manufacturer, which can be modified to some extent without drastically affecting derailleur performance.

The seat stay assembly 76, as shown in FIGS. 1 though 5, defines a solid central portion 126 having a pair of legs 128 extending rearwardly from the central portion 126, each leg extending along the side of the rear wheel 48. The solid central portion 126 pivotally attaches to the seat tube 36 to form the first pivot point 130, such as by a rod and bearing extending through an aperture in the central portion. This pivotal connection between the seat stay 76 and the seat tube 36 is in the range of approximately 5 inches to 12 inches above the rotational center 122 of the bottom bracket 44. In the preferred embodiment, the first pivot 130 is 8.25 inches vertically above the center 122 of the bottom bracket 44 and along the 73° line from horizontal. An acceptable range is from 5–12 inches vertically above the bottom bracket, and 4 inches or less on either side of, and measured normal to, the 73° line. A pair of legs extend forwardly from the solid central portion 126 and extend around the sides of the seat tube 36 and form the shock arm 82.

Each of the distal ends of the rearwardly extending legs 128 is received in the top connection point 62 of one of the drop links 60. A second pivotal connection 132 is formed between the distal end of each of the legs 128 of the seat stay assembly 76 and the top attachment point 62 of the drop link 60 by a screw received in a pin, with the pin engaging a bearing inserted in the aperture formed through the end of the leg (see FIG. 6).

The second pivot 132 is preferably 4.125 inches from the axle 52 at an angle of 65° above the horizontal. The position of the second pivot 132 is related to the first pivot 130. The second pivot 132 can be horizontally in-line with the first pivot 130 and displaced downwardly, up to the amount of the total suspension displacement. If the second pivot 132 is much lower than the suspension displacement from the first pivot 130, energy efficiency decreases. The fore/aft position of the second pivot 132 with respect to the first pivot 130 is not as important as its vertical relationship with the first pivot.

The two legs that extend forwardly of the central solid portion, where the first pivot is located, of the seat stay define the shock arm 82. The ends of these legs pivotally attach to a shock-absorbing member 86 on either side of a top end 84 thereof. The shock arm 82 extends at an angle downwardly from the line between the first 130 and second 132 pivot points approximately 160°. The shock-absorbing member 86 is mounted preferably at an angle of approximately 60 degrees between the line defined between the first pivot point 130 and the pivot point at the end of the shock arm 82, and the line defined by the axis of the shock 86 itself when at rest. This angle changes as the shock 86 is actuated since the shock is pivotally mounted at its base 88 and rotates about that point when actuated. The effectiveness of the shock-absorbing member 86 is controlled by the angle at which the shock arm 82 extends from the seat stay 76, the length of the shock arm 82, the type of shock-absorbing member 86, and the attachment position of the bottom end 88 of the shock.

Preferably, the shock arm 82 is pivotally attached to the top end 84 of the shock-absorbing member 86, with the bottom end 88 of the shock-absorbing member 86 attached to the seat tube 36 near the intersection of the seat tube and the down tube 40. A bracket 134 can be attached to the seat tube 36 and supported on the down tube 40 to pivotally attach to the bottom end 88 of the shock-absorbing member 86, as shown in FIG. 4. A suitable shock-absorbing member 86 is the Super Deluxe model made or sold by the Rockshox company of San Jose, Calif.

As will be described in greater detail below, when the rear ends of the seat stay 68 are moved in an upwardly direction, the shock arm 82 is forced in a downwardly direction, thus actuating the shock-absorbing member 86. It is contemplated that the shock-absorbing member 86 might be repositioned behind the seat tube 36 and activated off of the seat stay 76 or chain stay 68. Also, a pull-shock could be used with the appropriate structural modifications.

The seat stay 76 extends rearwardly and downwardly from the first pivot point 130 to the second pivot point 132. The seat stay 76 is preferably made of carbon composite or aluminum, with each leg of the seat stay having a substantially rectangular cross section to minimize any flexure in the vertical direction along its length.

The rear suspension assembly 22 thus is comprised of four rigid links 53, 54, 56, and 58 interconnected by the four pivot points. In the following discussion, reference will be made to the seat stay assembly 76, the chain stay assembly 68, and the drop links 60 in the singular, even though there is one such member on either side of the rear wheel 48. In addition, the different pivot points will be referred to in the singular even though there are two pivot point locations, one on either side of the rear wheel 48 and frame 24.

As set forth above, the first pivot point 130 is defined as the pivot point formed between the seat stay 76 and the seat tube 36. The second pivot point 132 is defined as the pivot point formed between the seat stay 76 and the top attachment point 62 of the drop link 60. The third pivot point 118 is defined as the pivotal connection between the chain stay 68 and the bottom bracket 44, and the fourth pivot point 124 is defined as the pivotal connection between the rear end of the chain stay 68 and the bottom attachment point 64 of the drop link 60.

The entire set of pivot locations is a complex relationship that comprises the suspension system 22. Some important characteristics with respect to the rear suspension system 22 include the axle path, leverage ratio, wheel rate, and energy efficiency. Each of the pivots have a different degree to which they affect the performance of these characteristics. Energy efficiency relates to the tendency of the suspension to compress, or otherwise actuate, the suspension due to the pedaling forces transmitted by the chain to the suspension system 22, which causes the suspension system to move, and thus use energy. Wheel rate is the force per unit length of actual displacement (such as pounds per inch) measured at the rear axle 52 from external inputs to the rear wheel 48, and could be rising, falling or level. Leverage ratio is a force ratio (unitless) obtained by dividing the force at the rear axle 52 by the force measured at the shock-absorbing member 86. This depends on axle path, and could also be rising, falling or level. The axle path is defined as the track which the axle traces as the rear suspension system 22 is compressed.

The first 130 and second 132 pivots affect the leverage ratio and the wheel rate along with having an effect on the axle path. The fore/aft positions of the first 130 and second 132 pivots affect mainly the leverage ratio, while the vertical height affects the efficiency of the system.

The third pivot 118 has a large effect on axle path, and only a small effect on leverage ratio and wheel rate. There are limitations on where the third pivot 118 can be placed due to the proximity of the bottom bracket 44, front derailleur, seat tube 36 and rear tire 48. The third 118 and fourth 124 pivots work together to control the axle path of the system in conjunction with the first 130 and second 132 pivots. The vertical heights of the third 118 and fourth 124 pivots also has an effect on energy efficiency.

The fourth pivot 124 is similar to the second pivot 132 in its effect on the suspension system 22. The location of the fourth pivot 124 is compromised by the location of the rear axle 52 and the rear derailleur.

The location and orientation of the shock-absorbing member 86 is also a variable in the leverage ratio and wheel rate. The rear suspension system 22 is activated by the rear wheel 48 impacting an object such as a rock. The impact between the rear wheel 48 and the object is typically "normal" to the circumference of the rear wheel. This "normal" impact has a horizontal component and a vertical component. Rarely does an impact have only a vertical or only a horizontal component. The movement of the rear wheel 48 upon impact is dependent upon the design of the rear suspension system 22.

Figure 7:
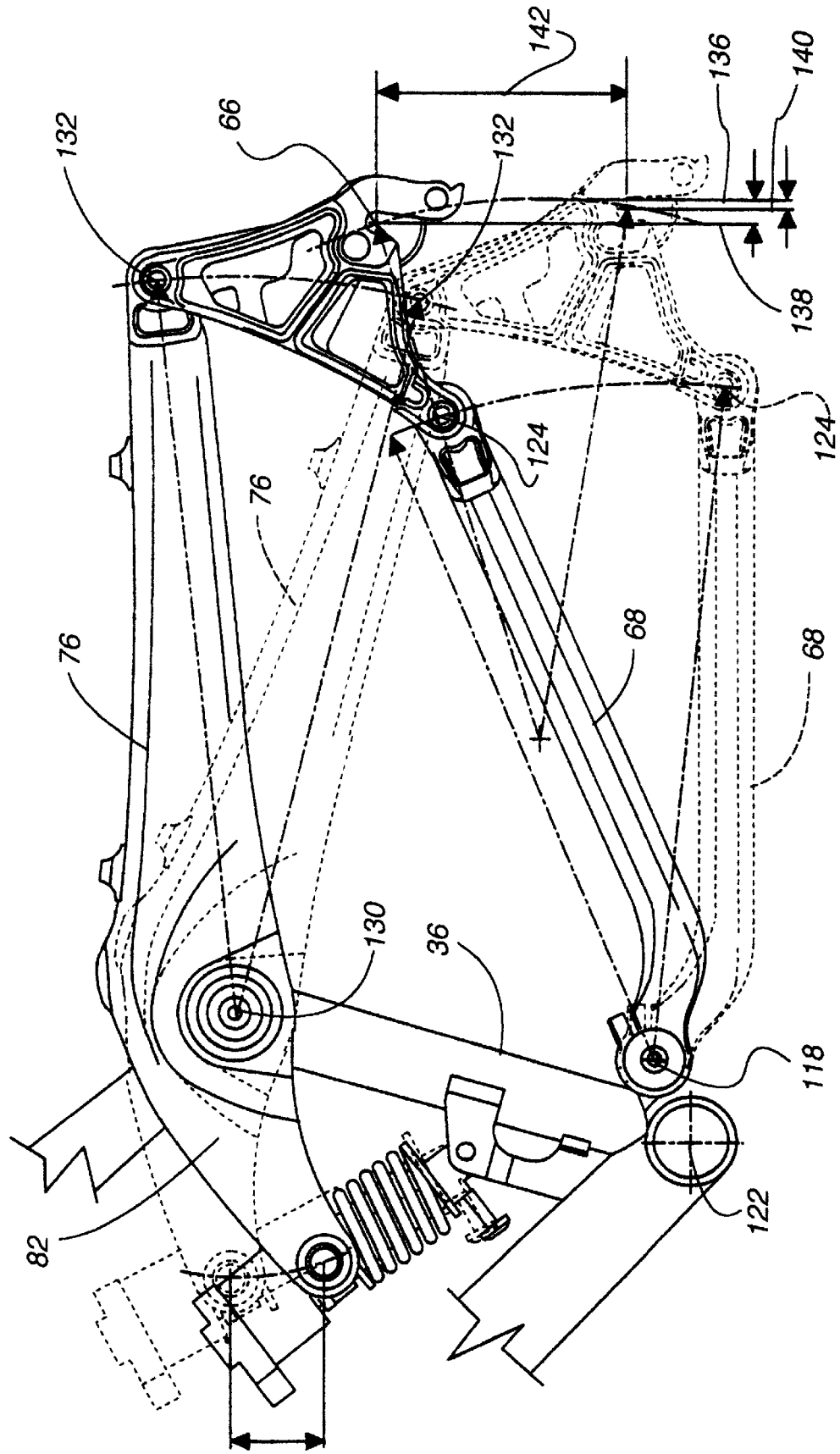
FIG. 7 is an elevation view of the frame of a bicycle incorporating the rear suspension of the present invention, and shows the rear suspension in—its non-compressed stage, and in full lines in its compressed stage.

Referring to FIGS. 3 and 7, when the rear suspension is actuated by an impact, the force is applied through the axle attachment point 66 to the drop link 60. Generally, the drop link is moved upwardly, which causes the chain stay 68 to rotate in a counter-clockwise direction (as shown) about the third pivot point 118, and the seat stay 76 to rotate in a counter-clockwise direction about the first pivot point 130. The rotational movement of the chain stay 68 and seat stay 76 about their respective third 118 and first 130 pivot points causes the drop link 60 to rotate clockwise about itself as it traces the axle path (see FIGS. 7 and 8). The amount that the drop link 60 rotates, and the particular movement of the axle attachment point 66 during the movement of the drop link is determined by the particular dimension of the four links of the rear suspension system 22 (See FIG. 8).

The axle path is designed to be substantially vertical with a slight movement in the rearward direction from its original position to a rearward most point 138, and then transitioning to a slight movement in the forward direction up to the terminal point 136 of compression, where the axle position is forward of the original, or datum 140, axle position. If the axle path has a significant rearward component, then a phenomenon called "kickback" occurs. Kickback occurs where the rear center dimension increases when the rear wheel 48 moves along the axle path through its suspension travel. The rear center dimension is the center-to-center measurement between the rotational center 122 of the bottom bracket 44 and the rear axle 52. Kickback is the result of the rearward movement of the rear axle 52 to the extent that a force is applied to the chain to try and turn the drive train in the reverse direction. If the axle path brings the axle 52 forward in an arcing motion approximately around the bottom bracket 44, the rear wheel is forced to move into the object, which is against the natural movement of the rear axle 52 under the impact forces. This can actually amplify the effects of the impact. This causes bumps which have a high rearwardly horizontal component to not be absorbed as efficiently.

Figure 8:
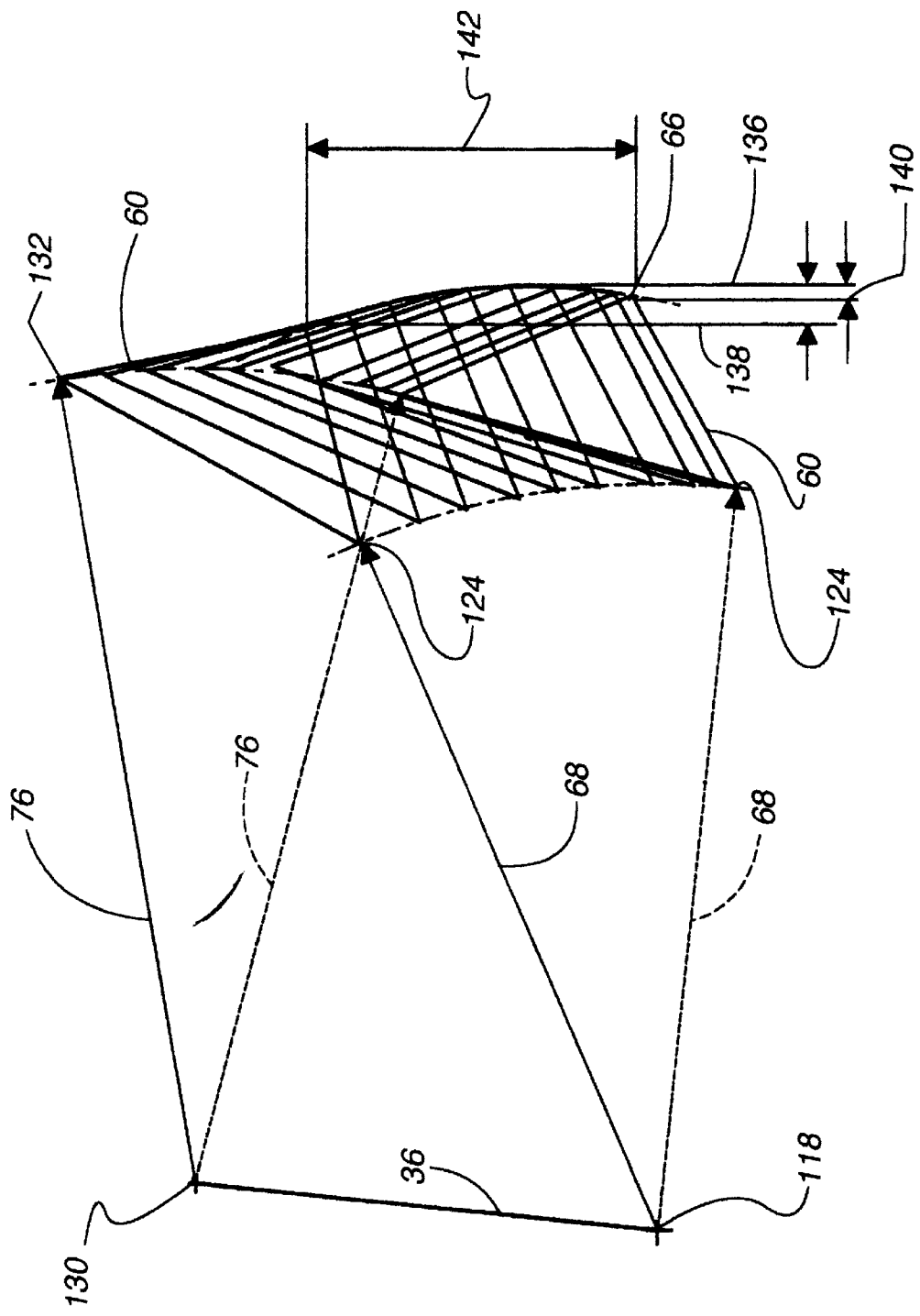
FIG. 8 is a schematic representation of the movement of the drop link through the range of suspension travel.

FIGS. 7 and 8 show the rear suspension system 22 in the non-compressed stage in dash, and the compressed stage in solid line (at its terminal position). The axle path created by the rear suspension system 22 of the present invention moves the axle 52 from the "at rest" or datum point 140 (non-compressed) rearwardly and then forwardly along an arcuate path in the substantially vertical direction. The rearward most point 136, approximately 0.18 inches behind the datum position, occurs at approximately 2 to 2.50 inches into the suspension stroke. The total suspension travel 142 is preferably approximately 4 to 4.3 inches, but could be as much as 6 inches or more. At the top of the suspension stroke, or at the terminal position 138, the axle 52 has moved forward from the rearwardmost position approximately 0.270 inches, or to approximately 0.090 inches forwardly of the datum point 140. See FIG. 7. Since the axle 52 reaches the rearwardmost position 136 at approximately one-half of the total suspension stroke, the axle path is considered to be balanced. The axle 52 retraces the path identically as the rear suspension system 22 moves from the terminal point 138 back to the datum point 140. The downward movement of the rear suspension system 22 is limited by the shock absorbing member.

The third 118 and fourth 124 pivots have a larger effect on the axle path than do the first and second pivots. In addition, the position of the pivot points on the drop link 60 with respect to each other affects the axle path. The substantially vertical axle path minimizes kickback and does not accentuate the impact. As the seat stay 76 is rotated in a counterclockwise direction as shown in FIG. 7 by the upward movement of the drop link 60, the shock arm 82 compresses the shock-absorbing member 86 thus damping the upward movement of the rear suspension system 22. At the same time as the shock arm 82 is compressing the shock-absorbing member 86, the shock-absorbing member 86 is also pivoted counterclockwise in the embodiment shown, to adjust to the arcuate movement of the end of the shock arm 82. The shock-absorbing member 86 can be actuated off of either the seat 76 or the chain stay 68.

Figure 9:
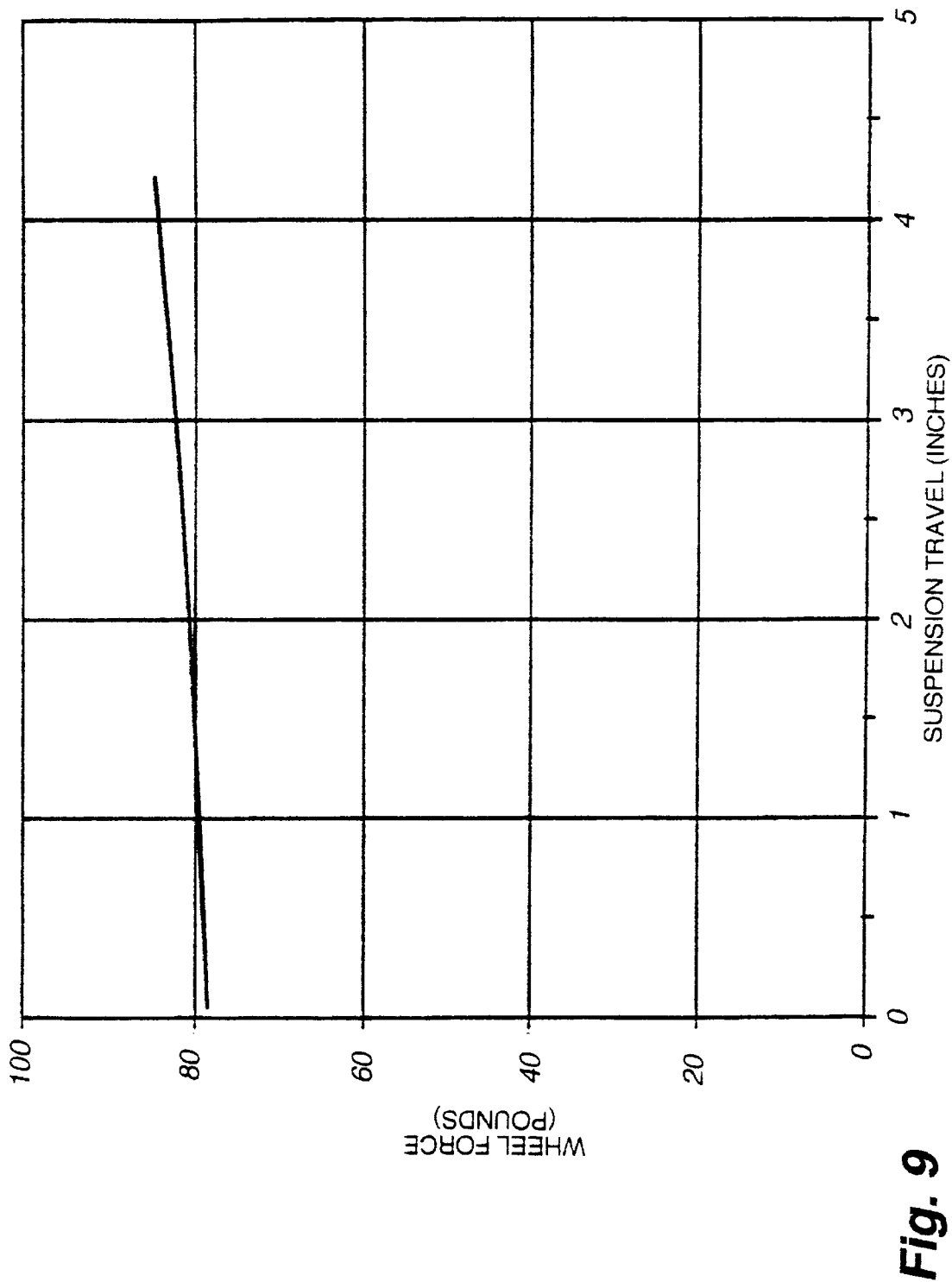
FIG. 9 is a graphical representation of wheel rate.

Wheel rate could be rising, falling or level. The rear suspension system of the present invention is designed to have a relatively level wheel rate, possibly rising at a rate of only 3%. A rising wheel rate means that it is harder to further compress the suspension 22 the further the suspension is compressed. A level wheel rate means that the effort to compress the suspension remains constant through the suspension travel. A falling wheel rate means that the effort to compress the suspension decreases through the suspension travel. FIG. 9 shows a graph representing the wheel rate for one particular embodiment. The X-axis is suspension travel in inches, and the Y-axis is wheel force in pounds. As can be seen from FIG. 9, the wheel rate starts at approximately 79 pounds per inch in the early compression stage, and rises to approximately 84 pounds per inch at full compression (approximately 4.25 inches). This represents a slightly rising wheel rate.

The angle between the second pivot 132 and the fourth pivot 124 of the drop link 60, with respect to the axle attachment point 66, affects the wheel rate but only to a small extent. The angle of the shock arm 82 with respect to the seat stay 76 and the angle of the shock-absorbing member 86 with respect to the shock arm 82 are major factors in the control of the wheel rate. The rate can be designed to be level, rising or falling by adjusting these factors.

In evaluating the energy efficiency of the rear suspension of the present invention it is important to understand the different forces acting on the rear suspension during the pedaling motion. In a suspension having a low pivot only (such as the third pivot 118), as the rider applies a downward force to the pedal the chain attempts to pull the rear wheel up about the low pivot point. The only resistance to this movement is the shock absorber. As the shock absorber is compressed, it consumes energy that could be used in moving the bicycle forward. These forces are balanced in the instant invention because the seat stay 76 keeps the chain from rotating the chain stay 68 about the low third pivot point 118 since it interferes with the arcuate movement of the chain stay 68. In a suspension having a high pivot only (such as the first pivot), when the rider applies a downward force on the pedal the chain applies a force tending to push the rear wheel down to pivot around the high pivot point. This makes the bike frame rise until the shock absorber will not allow any more upward movement of the frame. This effectively locks-out the suspension system so it no longer works, and consumes energy as the shock is extended. The chain stay 68 keeps the force of the chain from pivoting the seat stay 76 about the high pivot point. This force balancing is very efficient since it keeps a portion of the force applied to the drive train by the rider from compressing, or otherwise actuating, the rear suspension system 22, and thus more of the rider's effort results in the forward movement of the bicycle.

In the instant invention, the same force-balancing phenomenon occurs. Both the downward and upward movement tendency of the rear wheel 48 based on the chain force on the first and third pivots, respectively, make the drive train force transfer less efficient in the absence of this force balancing structure. The efficiency of the force balancing depends on relative placement of the first 130 and third 118 pivots, and on the direction of the chain force (which depends on the particular gear).

For preferred force balancing, the first 130 and second 132 pivots (top pivots) are roughly in line horizontally to obtain the most efficient force transfer. Similarly for preferred force balancing, the third 118 and fourth 124 pivots (bottom pivots) are preferably horizontally in line also for the most efficient force balancing.

Over the range of gears the variation in angle of the chain alters the force vector applied to the suspension 22. In the rear suspension system of the present invention, the differences in force applied to the rear suspension, as a result of different chain positions, do not greatly affect the energy efficiency of the rear suspension system due to the particular design of the placement of the pivot points. This is because the placement of the pivot points makes the suspension system 22 effectively isolated or independent from the varying chain loads. The particular pivot point and four link arrangement of the present invention effectively counterbalances the varying forces regardless of the chain positioning.

The seat tube 36 functionally terminates just above the first pivot point 130, where the top tube 42 angles downwardly to connect thereto. The top tube 42 branches upwardly and rearwardly at an angle to attach to a top portion 144 of the seat tube 36. The top portion of the seat tube receives the seat post. A cut-out area or frame recess 148 is formed to allow unimpeded movement of the seat stay 76 from the non-compressed position to the fully compressed position where the end of the seat stay 76 is at its highest, most compressed location. An angle bracket 150 is attached between the three legs of the recess 148 to provide structural support (FIG. 4).

The four-link rear suspension system 22 of the present invention efficiently counter-balances the force vector due to chain loading to substantially eliminate any energy inefficiencies due to the compression of the suspension under the chain load. In addition, the rear suspension 22 allows substantial suspension travel without generating kickback or accentuating the wheel impact by creating a substantially vertical axle path having a slight rearward arc. The wheel rate remains substantially constant through the travel of the suspension to allow the use of the entire range.

Presently preferred embodiments of the present invention and many of its improvements have been described with a degree of particularity. The previous description is of a preferred example for implementing the invention, and the scope of the invention should not necessarily be limited by this description. The scope of the present invention is defined by the scope of the following claims.

What is claimed is:

1. A rear suspension bicycle comprising:
   a rear wheel with an axle and a derailleur;
   a frame including a seat tube and a down tube having a top and bottom ends, the bottom of the seat tube and the bottom of the down tube being connected by a bottom bracket, the bottom bracket having a rotational center;

a rear suspension system having a suspension travel of between zero and six inches, including:

a pair of separate drop link members, one for either side of the rear wheel, each having a top attachment point and a bottom attachment point, and an axle attachment point for receiving said axle, each of said drop link members being substantially triangular in shape with the top, axle and bottom attachment points positioned at one of the tips of said triangle shape, and on one of said pair of drop link members adjacent the derailleur, a side of said triangle shape formed between said axle and bottom connection point being curved inwardly to allow free movement of said derailleur;

a seat stay assembly having a front end and a rear end, and having a front pivot point adjacent the front end for pivotal attachment to seat tube defining a first pivot point, and a pair of rear pivot points, each for pivotal attachment to the top attachment point of one of said drop link members, forming together the second pivot point;

a chain stay assembly having a front end and a rear end, and defining a front pivot point at said front end, and a pair of rear pivot points at said rear end, said front pivot point for pivotal attachment adjacent to the bottom end of the seat tube forming the third pivot point, and a pair of rear pivot points, each for pivotal attachment to the bottom attachment point of one of said drop link members, forming together the fourth pivot point; and a shock-absorbing element mounted between the seat stay assembly and the frame;

the first pivot positioned substantially upwardly and rearwardly of the bottom bracket;

the second pivot positioned in the range from being in horizontal alignment with the first pivot to approximately 4 inches below the first pivot;

the third pivot positioned upwardly and rearwardly from, but adjacent to, the bottom bracket; and the fourth pivot positioned in the range from being in horizontal alignment with the third pivot to approximately 3 inches below the third pivot.

2. The rear suspension bicycle as defined in claim 1, wherein:

a shock arm extends from said seat stay assembly forwardly of said seat tube;

said shock absorbing element is mounted between the shock arm and the frame.

3. The rear suspension bicycle as defined in claim 1, wherein:

a shock arm extends from said seat stay assembly forwardly of said seat tube;

said shock absorbing element is mounted between the shock arm and the seat tube.

4. The rear suspension bicycle as defined in claim 1, wherein:

a shock arm extends from said seat stay assembly forwardly of said seat tube;

said shock absorbing element is mounted between the shock arm and the intersection of said down tube and said seat tube.

5. The rear suspension bicycle as defined in claim 1, wherein:

said third pivot point, said fourth pivot point and said axle attachment point form an obtuse "V" shape to initially force axle rearwardly upon actuation of said rear suspension system to soften impact.

6. The rear suspension bicycle as defined in claim 5, wherein:

a shock arm extends from said seat stay assembly forwardly of said seat tube;

said shock absorbing element is mounted between the shock arm and the frame.

7. The rear suspension bicycle as defined in claim 5, wherein:

a shock arm extends from said seat stay assembly forwardly of said seat tube;

said shock absorbing element is mounted between the shock arm and the seat tube.

8. A rear suspension bicycle comprising:

a rear wheel with an axle;

a frame including a seat tube and a down tube having a top and bottom ends, the bottom of the seat tube and the bottom of the down tube being connected by a bottom bracket, the bottom bracket having a rotational center;

a rear suspension system having a suspension travel of between zero and six inches, including:

a pair of separate drop link members, one for either side of the rear wheel, each having a top attachment point and a bottom attachment point, and an axle attachment point for receiving said axle, each of said drop link members having a substantially triangularly-shaped body having three tips, with the top, axle and bottom attachment points positioned at one of the tips of said triangle shape;

a seat stay assembly having a front end and a rear end, and having a front pivot point adjacent the front end for pivotal attachment to seat tube defining a first pivot point, and a pair of rear pivot points, each for pivotal attachment to the top attachment point of one of said drop link members, forming together the second pivot point;

a chain stay assembly having a front end and a rear end, and defining a front pivot point at said front end, and a pair of rear pivot points at said rear end, said front pivot point for pivotal attachment adjacent to the bottom end of the seat tube forming the third pivot point, and a pair of rear pivot points, each for pivotal attachment to the bottom attachment point of one of said drop link members, forming together the fourth pivot point; and a shock-absorbing element mounted between the frame and the suspension system;

the first pivot positioned substantially upwardly and rearwardly of the bottom bracket;

the second pivot positioned in the range from being in horizontal alignment with the first pivot to approximately 4 inches below the first pivot;

the third pivot positioned upwardly and rearwardly from, but adjacent to, the bottom bracket; and the fourth pivot positioned in the range from being in horizontal alignment with the third pivot to approximately 3 inches below the third pivot.

9. The rear suspension bicycle as defined in claim 8, wherein:

said third pivot point, said fourth pivot point and said axle attachment point form an obtuse "V" shape to initially force axle rearwardly upon actuation of said rear suspension system to soften impact.

10. The rear suspension bicycle as defined in claim 8, wherein:

a shock arm extends from said seat stay assembly forwardly of said seat tube;

said shock absorbing element is mounted between the shock arm and the frame.

11. The rear suspension bicycle as defined in claim 8, wherein:

a shock arm extends from said seat stay assembly forwardly of said seat tube;

said shock absorbing element is mounted between the shock arm and the seat tube.

12. The rear suspension bicycle as defined in claim 8, wherein:

said top attachment point is greater than approximately 4.00 inches from said axle attachment point;

said bottom attachment point is greater than approximately 3.5 inches from said axle attachment point; and the angle formed between a line formed by the top attachment point and the axle attachment point, and a line formed by the bottom attachment point and the axle attachment point is greater than 90 degrees.

13. The rear suspension bicycle as defined in claim 8, wherein said angle is approximately 95 degrees.

14. The rear suspension bicycle as defined in claim 8, wherein a side of said triangularly-shaped drop link formed between said bottom attachment point and said axle attachment point is curved inwardly.

* * * * *